United States Patent
Zhou

(10) Patent No.: US 9,346,060 B2
(45) Date of Patent: May 24, 2016

(54) WATER ION AIR PURIFIER

(71) Applicant: Zhiqiang Zhou, Guangzhou (CN)

(72) Inventor: Zhiqiang Zhou, Guangzhou (CN)

( * ) Notice: Subject to any disclaimer, the term of this patent is extended or adjusted under 35 U.S.C. 154(b) by 0 days.

(21) Appl. No.: 14/733,963

(22) Filed: Jun. 9, 2015

(65) Prior Publication Data

US 2015/0266032 A1    Sep. 24, 2015

Related U.S. Application Data

(63) Continuation-in-part of application No. PCT/CN2013/001191, filed on Oct. 8, 2013.

(30) Foreign Application Priority Data

Dec. 26, 2012    (CN) .......................... 2012 1 0589889

(51) Int. Cl.
| | |
|---|---|
| *B01D 53/02* | (2006.01) |
| *B03C 3/017* | (2006.01) |
| *F24F 3/16* | (2006.01) |
| *F24F 6/12* | (2006.01) |
| *B03C 3/38* | (2006.01) |
| *B03C 3/88* | (2006.01) |
| *B03C 3/16* | (2006.01) |
| *B03C 3/41* | (2006.01) |
| *B03C 3/47* | (2006.01) |
| *F24F 6/00* | (2006.01) |

(52) U.S. Cl.
CPC ................ *B03C 3/0175* (2013.01); *B03C 3/16* (2013.01); *B03C 3/38* (2013.01); *B03C 3/41* (2013.01); *B03C 3/47* (2013.01); *B03C 3/88* (2013.01); *F24F 3/1603* (2013.01); *F24F 6/12* (2013.01); *B03C 2201/04* (2013.01); *F24F 2003/1617* (2013.01); *F24F 2006/006* (2013.01)

(58) Field of Classification Search
CPC .... B03C 2201/04; B03C 3/0175; B03C 3/16; B03C 3/18; B03C 3/41; B03C 3/47; B03C 3/88; F24F 2003/1617; F24F 2006/006; F24F 3/1603; F24F 6/12
See application file for complete search history.

(56) References Cited

U.S. PATENT DOCUMENTS 3,729,898 A * 5/1973 Richardson ............... B03C 3/16
                                                         261/116
5,902,380 A * 5/1999 Tomimatsu .......... B01D 53/504
                                                          95/71

(Continued)

*Primary Examiner* — Christopher P Jones
(74) *Attorney, Agent, or Firm* — Wayne & King LLC

(57) ABSTRACT

Provided is an air purification device, wherein a main body comprises air inlets at two sides. An air extractor at an air outlet draws in air; when entering, the air firstly passes through a negative high voltage wire to carry on a negative charge and be sterilized, and then is mixed with nanoscale water mist sprayed out from a spray pipe and enters a dust collection board; the water mist is electrolyzed from water in a water supply tank by an electrolyzer to generate alkaline water, which is supplied to a water storage tank and atomized by an ultrasonic atomizer prior to being ionized into nanoscale water mist by nano-electrodes so as to be sprayed out; and when air flows through a water mist stream, charged contaminative gases are mixed with the water mist, are separated from the air stream under the action of inertia and an attractive force from the electric field of the dust collection board, and collide with droplets to be captured, intercepted and collected, and when PM 2.5 and other dusts in the air are wetted by the droplets to condense into larger particles, gravity settling is realized, with particles with a certain weight falling into a waste water tank to be discharged out, and separated clean air is released out.

5 Claims, 5 Drawing Sheets

(56) References Cited

U.S. PATENT DOCUMENTS

| | | | |
|---|---|---|---|
| 2009/0018668 A1* | 1/2009 | Galbraith | B01J 20/3441 623/23.65 |
| 2010/0104487 A1* | 4/2010 | Smid | B01D 46/34 422/213 |
| 2010/0313580 A1* | 12/2010 | Morioka | B05B 5/057 62/78 |
| 2013/0186748 A1* | 7/2013 | Yoon | F24F 6/12 204/229.4 |
| 2013/0269518 A1* | 10/2013 | Ilmasti | B03C 3/014 95/7 |
| 2015/0107456 A1* | 4/2015 | Ursem | B03C 3/08 96/55 |
| 2015/0266031 A1* | 9/2015 | Mills | B03C 3/017 95/71 |

* cited by examiner

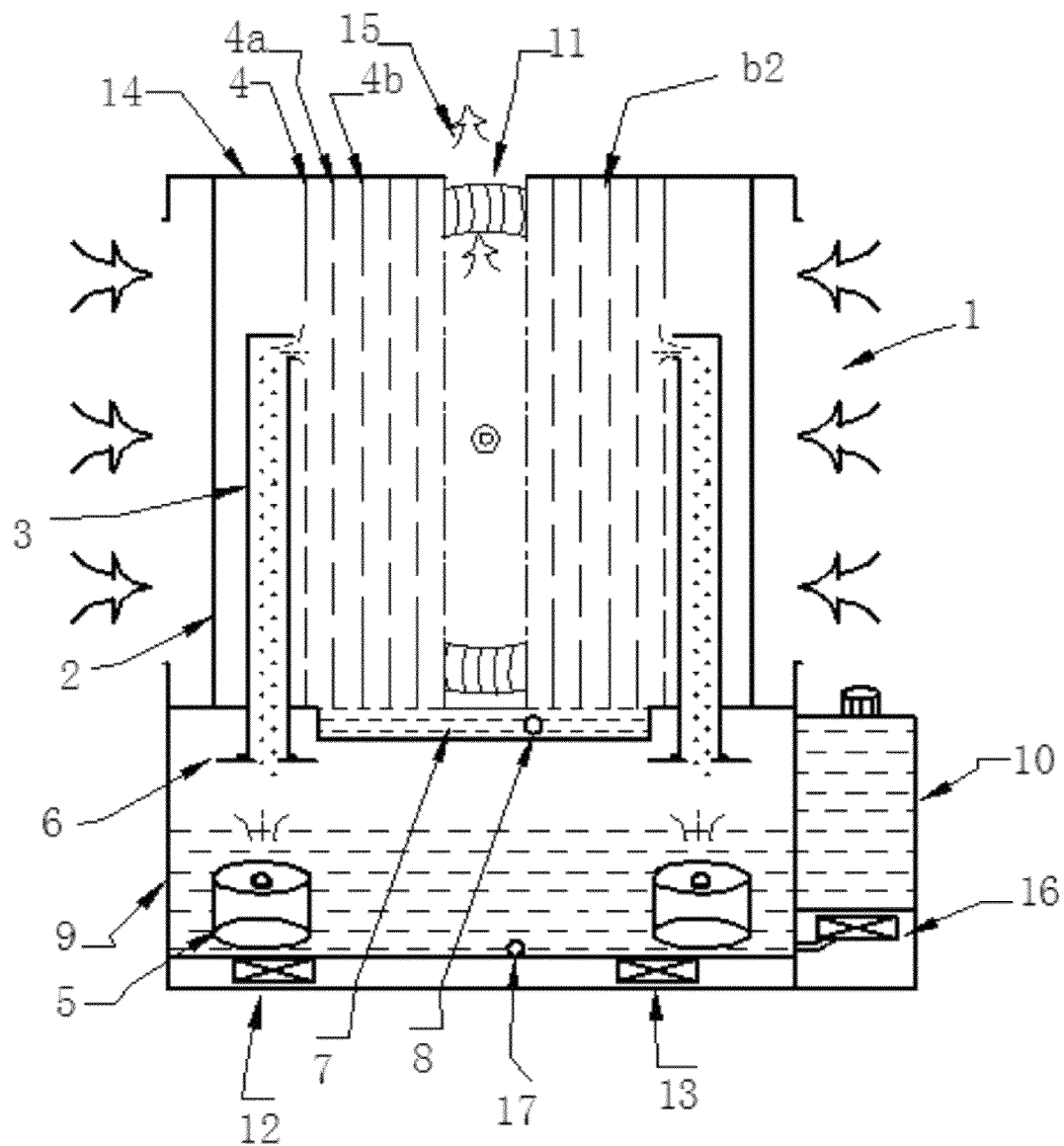
Fig. 2-a

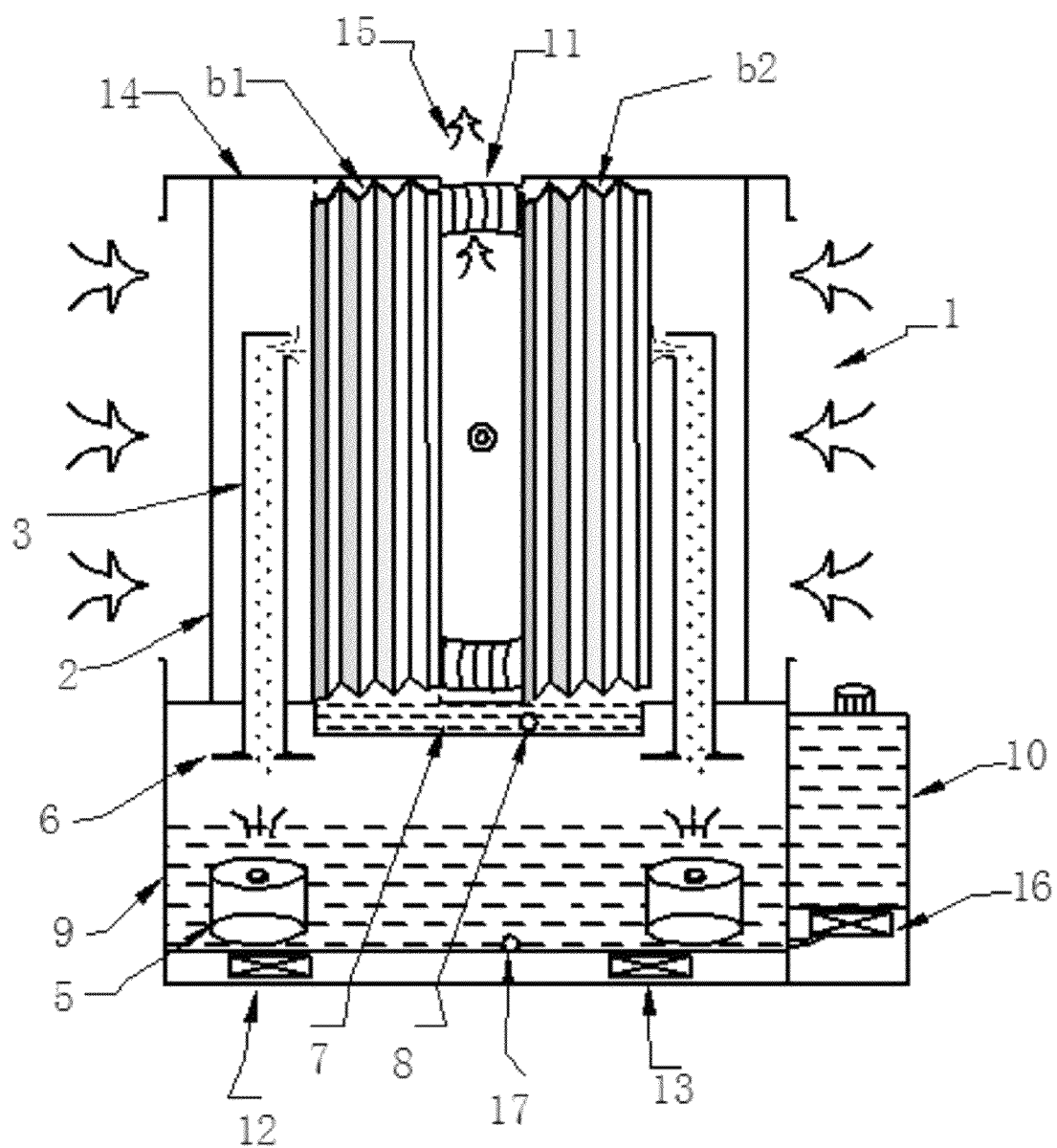
Fig. 2-b

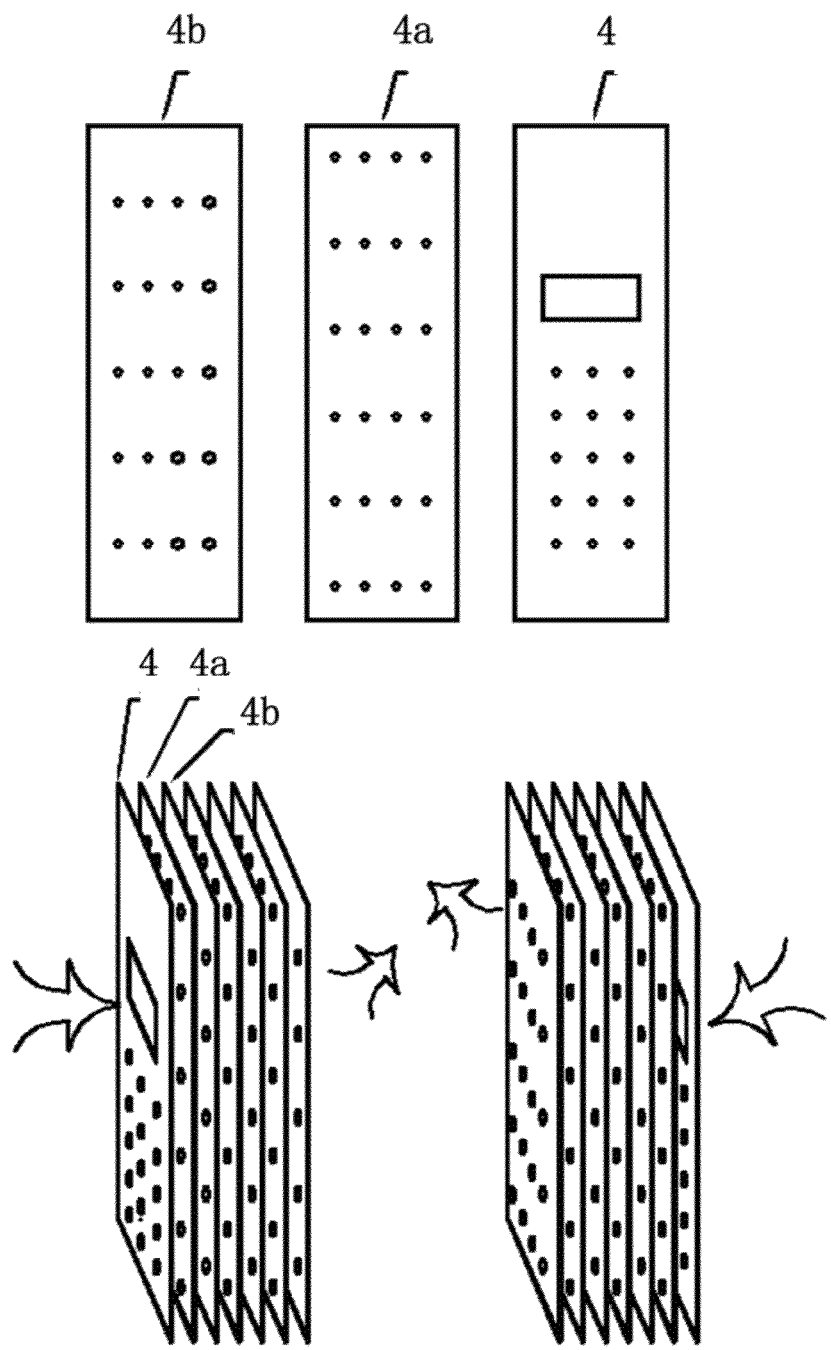
Fig. 3-a

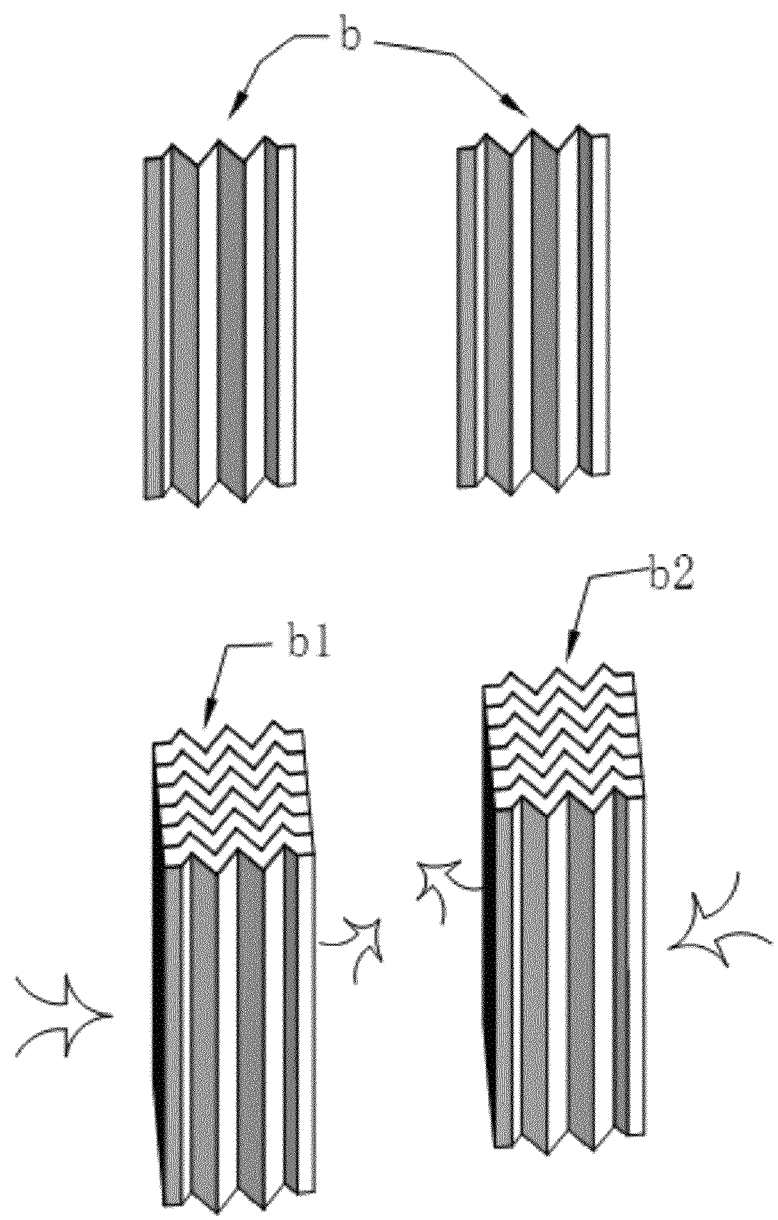
Fig. 3-b

WATER ION AIR PURIFIER

CROSS-REFERENCE TO RELATED APPLICATIONS

This application is a continuation-in-part of International Patent Application No. PCT/CN2013/001191 with an international filing date of Aug. 10, 2013, designating the United States, now pending, and further claims priority benefits to Chinese Patent Application No. 201210589889.2 filed Dec. 26, 2012. The contents of all of the aforementioned applications, including any intervening amendments thereto, are incorporated herein by reference.

TECHNICAL FIELD

The present invention belongs to an air purification technology, particularly relates to anion sterilization and purification of air, electrostatic dust removal, charged nano water mist dust removal, baffle demisting, ultrasonic atomization and formaldehyde removal by alkaline electrolyzed water. The present invention relates to cleaning and separation of air by generating nano anion water mist, in particular to a method and a device for absorbing, separating, cleaning and filtering fine dust particles in the air by automatically generating nano anion water mist. Water before atomization is decomposed through an electrolyser (for generating alkaline water), wherein polluted air such as fine dust, PM2.5, bacteria, formaldehyde and the like in the air can be filtered out for achieving the effect of air purification so that the air generated (filtered) by the present invention is especially clean, fresh, comfortable and healthy, because the water ion air purifier of the present invention has common points with all purifiers in domestic and international markets but also has distinct points: the air is humid (comfortable), the air has ecological anions (fresh and clean, and no carbon black) and the air is not polluted secondarily (healthy)!

BACKGROUND OF THE PRESENT INVENTION

With the development of industry and the appearance of automobiles, a large quantity of polluted air is generated by synthetic furniture, chemical paint, exhaust gas discharged from factory combustion and the like. Such pollution becomes a root of endangering human health in real life. Therefore, in order to prevent air pollution and bacteria transmission, the water ion air purifier can be used for purifying the air.

Currently, there are many different kinds of known air purifiers, but the present technical methods for air filtration are almost the method of a filter screen and electrostatic dust collection and filtration and the method for absorption, filtration and sterilization through a filter screen made of chemically synthetic material. However, both of the above two technologies have a fatal shortcoming that the technologies cannot be effectively used for long and are easy to cause secondary pollution. Although different technical modes adopted in the above screen type absorption and filtration of the air make filtration effects good, the adoption of a filter screen interception and absorption will result in dust collecting effect reduction and even failure, if dust is accumulated in a dust collecting screen after the polluted air is absorbed for certain time. Therefore, the dust collecting screen needs to be replaced. The effects of purification, sterilization and the like are also greatly reduced and even fail by the filter screen made of the chemically synthetic material after certain saturation capacity is achieved. If the screen is not replaced in time, secondary pollution will be caused!

The water ion purifier of the present invention is characterized in that negatively charged ultrasonic nano water mist is automatically generated; the water mist is generated by ultrasonic atomization of the electrolyzed alkaline water and can kill the bacteria in the air; harmful polluted air and dust such as formaldehyde, PM2.5 and the like are separated; the water is atomized through ultrasonic waves by an electrostatic absorption technology, a charged water mist wet trapping technology and a gravitational settling technology, and is ejected by a mist pipe; and two electrodes of a nano ion generator are installed above a water outlet of the water mist pipe to form a high-voltage electronic electric field used for ionizing and refining the water mist into thinner nanoscale water mist and ejecting for sterilization. Two electrodes of an anion generator are installed in air intake vents of the water ion purifier. One high-voltage negative emitter is used for ionizing and sterilizing the air and enabling the air to be negatively charged, and the other electrode is connected to dust collecting plates of a low-voltage electrode so as to form an ultrahigh-voltage electromagnetic field for the air water mist. Outside air is attracted by the wind power of an exhaust fan and is negatively charged immediately once entering the product of the present invention. Meanwhile, the outside air is mixed with the nanoscale water mist to form anion air water mist; the anion air water mist is attracted into the dust collecting plates of the low-voltage electrode; the polluted charged water mist with dust is absorbed to the dust collecting plates of the electrode due to its heavy gravity; the water mist absorbed to the dust collecting plates of the electrode because of containing the dust is continuously accumulated and increased to form a large water ball; and the large water ball freely falls into a water collecting tank due to gravity and is discharged to outdoor underground. The water mist air which does not contain pollutants such as dust, PM2.5 particles, formaldehyde and the like passes through the dust collecting plates of the low-voltage electrode due to light gravity, and has humidity; and pure and healthy air with biological anions enters a room through an air outlet of the product. The present invention is widely applied and is used in environments and devices of indoor air purification, air purification in public entertainment places, air conditioners, automobiles, ships, kitchen range hoods and the like.

SUMMARY OF THE PRESENT INVENTION

The present invention aims to propose an air purifier, imitates the effects of wind, rain, thunder and lightning in the nature and has excellent and long-term effective function of killing the bacteria in the air. Harmful polluted air and dust such as formaldehyde, respirable particles of PM2.5 and the like in the air are separated and clean and fresh air is discharged.

The main purposes of the present invention are to achieve gravitational settling and separation of the air pollutants and PM2.5 particles through wet trapping by using a nano water mist charging technology, to perform long-term cleaning and dust removal on dust collecting devices in the purifier itself by using the water mist, to creatively solve the defect of an ordinary purifier that the dust collecting devices fail and are replaced complexly after long-term usage, and to enable air humidity to be within the range which makes human body the most comfortable (constant humidity of 50%-70%) for long.

In order to achieve the above objectives, the water ion air purifier of the present invention has an air intake system, a wind delivery system and an air exhaust fan which is used for drawing the outside air into a water mist (ion) purification system of the purifier so as to discharge clean and fresh air after separating the polluted air.

The water mist (ion) purification system comprises a water supply tank, an ultrasonic atomizer, nano spray pipes, a nano high-voltage electrode, an anion high-voltage electrode, an electrolyser, dust collecting plates, a waste water recycling bin and a sewage drain pipe.

When the water ion purifier is started, the outside polluted air is purified and discharged by the air exhaust fan via the water mist (ion) purification system. When the exhaust fan is started, the polluted air first flows through an anion emitter line (2); the polluted air carries the negative charge when entering the anion emitter line (2); then, the negatively charged polluted air flows through the nano spray pipes (3) with high voltage; the nano water mist sterilizes the air and generates the effects of interception, collision and agglomeration on fine dust polluted particles of PM2.5 in the air for realizing catching; and the harmful substances of fine particles of PM2.5, TVOC formaldehyde and the like of the polluted air are separated from the air. Finally, the humidified and negatively charged air flows through the grounding dust collecting plates, and is ionized and decomposed again. Because of the acting force of the charge in the electric field, the fine dust particles of PM2.5 are bonded to the dust collecting plates; the fine particles of PM2.5 on the dust collecting plates are continuously heavier due to accumulation with the nano water mist, and then, settled downwards, flow to the waste water recycling bin together with mist drops and are discharged, while the separated clean air is continuously discharged into the air outlet via the exhaust fan. The discharged clean air has humidity and ecological anions approaching the nature, and has a humidifying function so that indoor air is fresher and cleaner.

BRIEF DESCRIPTION OF THE DRAWINGS

FIG. 2-a is a longitudinal profile diagram of embodiment 1 of the present invention;

FIG. 2-b is a longitudinal profile diagram of embodiment 2 of the present invention;

FIG. 3-a is a single-piece front diagram and a combined diagram of dust collecting plates of embodiment 1 of the present invention; and FIG. 3-b is a single-piece front diagram and a combined diagram of dust collecting plates of embodiment 2 of the present invention.

DETAILED DESCRIPTION OF THE PRESENT INVENTION

Figure 1:
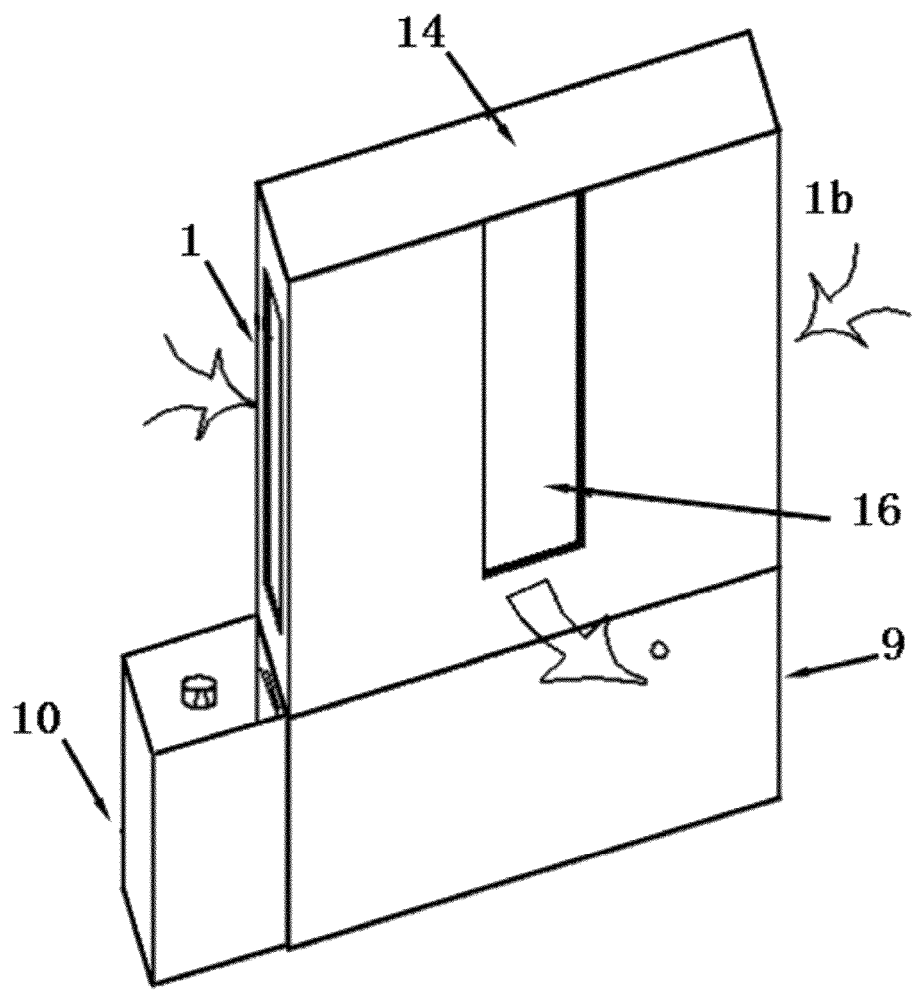
FIG. 1 is a stereo diagram of a water ion purifier of the present invention.

Two embodiments are adopted by the dust collecting plates of the present invention: one embodiment is straight plate drilling type, known as embodiment 1; and the other embodiment is wavy plate sheet type, known as embodiment 2. The working principles of the two embodiments are consistent.

Embodiment 1

The present invention will be described in details with reference to embodiment 1 in the drawings.

FIG. 1 is a stereo diagram of the water ion air purifier of the present invention, and FIG. 2-a is a longitudinal profile diagram of the water ion purifier of the present invention.

As shown in FIG. 1 and FIG. 2-a, the water ion air purifier of the present invention comprises: a main body 14, wherein a water storage tank 9 is arranged on the bottom of the main body, the water supply tank 10 is arranged below the right air inlet of the main body 14, the water in the water supply tank is connected with and supplied to the water storage tank 9 after electrolyzed by the electrolyser 16, a cleaning and draining port 17 is arranged on the bottom of the water storage tank, and two air inlets 1 are respectively arranged on the left side and the right side of the main body; and an air outlet 15, wherein the air outlet is installed on the back surface of the main body 14. The exhaust fan 11 is installed and is close to the air outlet on the back surface of the main body 14, and is used for absorbing and purifying the outside air and discharging the purified fresh air.

As shown in FIG. 2-a, the anion generator 12 is installed in the bottom of the main body 14; the emitter of the anion generator 12 is connected with an emitter steel wire 2; and a grounding electrode is connected to the dust collecting plates 4, 4a and 4b on both sides so that an electric field is formed between the dust collecting plates 4, 4a and 4b and the anion emitter steel wire 2 for achieving the effects of dust collection and mist collection. Meanwhile, the anions play the action of purification and sterilization. A waste water tank 7 is arranged on the bottoms of the dust collecting plates on both sides. A waste water draining interface 8 is arranged on the bottom of the waste water tank. After separated, the pollutants in the air, such as PM2.5, formaldehyde, TOVC and the like are settled into the waste water tank 7 under the action of the gravity of the mist drops and then discharged. As shown in FIG. 2-a, in order to make the mist drops finer, a nano electrode generator 13 is installed on the bottom of the main body 14; and the emitter of the nano electrode generator 13 comprises two steel needles and is installed on the bottom ends of the nano spray pipes 3 on both sides of the main body 14, known as a nano emitter 6. The purpose is to further refine the mist drops which originally achieve the nanoscale and which are generated by the ultrasonic atomizer 5 by using high-voltage fierce impact; and the mist, can enhance the catching and the settling of the respirable particles of PM2.5, and can simultaneously play the action of sterilization. Meanwhile, the water atomized by the ultrasonic waves is alkaline water electrolyzed and separated by the electrolyser 16. The electrolyzed water can effectively play the action of removing the formaldehyde in long term, and also has the efficacy of sterilization and deodorization.

As shown in FIG. 3-a, the dust collecting plates 4 on both sides of the main body are formed by drilling conductive plate sheets. When the dust collecting plates are lined up, vent holes of the dust collecting plates 4, 4a and 4b are wavy. In this way, when the air enters the dust collecting plates in a wavy shape, the air impacts the dust collecting plates. Under the fierce impact and the electrostatic absorption, the action of separating the air pollutants is performed. With the addition of the catching of the nano charged water mist, the dust collection effect is maximized. The pollutants bonded to the dust collecting plates are agglomerated with the increase of the mist drops, flushed into the waste water tank by mist beads and then discharged. The dust collecting plates are ensured against failure due to long-term dust deposition. The other function of the dust collecting plates is dehydration. After the water mist enters the dust collecting plates, through layers of interception of the dust collecting plates in the mode of deflection of jet, only purified fresh air with slight humidity which is just fit for human feeling (constant humidity of 50%-70%) is discharged finally.

Embodiment 2

As shown in FIG. 1 and FIG. 2-*b*, the entirety of the present invention and the working principles are consistent. As shown in b1 and b2 in FIG. 3-*b*, the only difference is that the dust collecting plates are formed by combining wavy conductive plate sheets. As shown in FIG. 2-*b*, the installation positions of the dust collecting plates are consistent with those in embodiment 1 and the working principles are consistent. The main difference between two kinds of dust collecting plates in FIG. 2-*a* and FIG. 2-*b* is that the former has larger resistance to wind and is suitable for being installed in places with small ventilation, and the latter has slightly smaller resistance to wind compared with the former and is suitable for places with large ventilation.

I claim:

1. An air purifier device, wherein the main body (14) comprises air inlets (1) on both sides, an air outlet (15) and an exhaust fan (11) of the air outlet, wherein the exhaust fan is used for drawing outside air into the main body of the purifier, purifying the outside air and then discharging clean air; firstly, when the air enters the main body, the air is negatively charged and sterilized by an anion emitter steel wire (2); the negatively charged air is mixed with nano water mist ejected by nano spray pipes (3) and enters the dust collecting plates (4, 4*a* and 4*b*; or b1 and b2); the nano water mist is atomized by an ultrasonic atomizer (5) in a water storage tank (9), ionized and refined by a nano emitter (6) and then ejected; and the water in the water storage tank is supplied by the water, which is electrolyzed by an electrolyser (16), in a water supply tank (10); when the air flows through mist drops, fine dust particles in the air will collide with the mist drops, separating from an air stream which flows around due to an inertia effect, and are caught, intercepted and agglomerated; after the fine dust particles in the air are absorbed by a negative charge and humidified by the mist drops, the fine dust particles are agglomerated and become larger particles for achieving gravitational settling; after the air is mixed with the mist drops, the air flows through the dust collecting plates; due to impact force, humidifying adhesion and the electrostatic absorption of an electric field of the dust collecting plates, the charged dust particles are bonded to the dust collecting plates, fall into a waste water tank (7) after achieving certain gravity and are discharged by a draining interface (8); however, the separated and negatively charged ecological clean air without dust particles is continuously drawn out by the exhaust fan (11).

2. The purifier device according to claim 1, wherein the nano emitter (6) is installed on the spray pipes and has the action of emitting nanoscale superfine mist drops; and the nanoscale superfine mist drops have the action of catching, separating and agglomerating the fine dust particles in the air.

3. The purifier device according to claim 1, wherein the dust collecting plates (4, 4*a* and 4*b*; or b1 and b2) are installed in the main body (14) in two forms; due to the wavy fluid mechanics principle and structure, when the air enters the dust collecting plates in a wavy shape, the pollutants in the air can be better separated with the cooperation of the catching of the nano mist drops under the action of the impact force; and in addition, the air is recycled and discharged under the electrostatic absorption of the electric field of the dust collecting plates so that the discharged air is fresh and clean.

4. The purifier device according to claim 1, wherein the anion emitter steel wire (2) is connected by an emitter of an anion generator (12), while a grounding electrode is connected with the dust collecting plates on both sides of the main body; and an electric field is formed by the anion emitter steel wire (2) and the dust collecting plates on both sides to play the action of sterilization and dust collection on the air.

5. The purifier device according to claim 1, wherein the nano mist which is obtained by atomizing and ionizing the electrolyzed water has a long-term effective action on dust removal, deodorization and formaldehyde removal.

* * * * *